United States Patent [19]

MacConochie et al.

[11] Patent Number: 5,031,857
[45] Date of Patent: Jul. 16, 1991

[54] TWO-STAGE EARTH-TO-ORBIT TRANSPORT WITH TRANSLATING OBLIQUE WINGS FOR BOOSTER RECOVERY

[75] Inventors: Ian O. MacConochie, Yorktown; Charles A. Briener, Hampton, both of Va.

[73] Assignee: The United States of America as represented by the Administrator of the National Aeronautics and Space Administration, Washington, D.C.

[21] Appl. No.: 433,804

[22] Filed: Nov. 9, 1989

[51] Int. Cl.⁵ .............................................. F42B 10/00
[52] U.S. Cl. .................................... 244/3.28; 244/46; 244/49; 244/172
[58] Field of Search ............... 244/46, 49, 138 R, 172, 244/3.27, 3.28

[56] References Cited

U.S. PATENT DOCUMENTS

| | | | |
|---|---|---|---|
| 4,132,374 | 1/1979 | Abell | 244/46 |
| 4,834,324 | 5/1989 | Criswell | 244/172 |
| 4,842,218 | 6/1989 | Groutage et al. | 244/49 |
| 4,884,770 | 12/1989 | Martin | 244/172 |

Primary Examiner—Richard W. Wendtland
Attorney, Agent, or Firm—George F. Helfrich

[57] ABSTRACT

A two-stage earth-to-orbit transport includes an orbiter vehicle and a pair of boosters, each having a depolyable oblique wing located along a longitudinal axis of the booster. The wing is deployed in an oblique disposition in supersonic and hypersonic speeds, and disposed at 90° for subsonic speeds encountered during entry. The oblique wing is driven axially and rotated by means of a turret mounted on rails.

3 Claims, 2 Drawing Sheets

TWO-STAGE EARTH-TO-ORBIT TRANSPORT WITH TRANSLATING OBLIQUE WINGS FOR BOOSTER RECOVERY

ORIGIN OF THE INVENTION

The invention described herein was jointly made in the performance of work under a NASA Contract and is subject to the provisions of Section 305 of the National Aeronautics and Space Act of 1958, as amended, Public Law 85-568 (72 Stat. 435; 42 USC 2457).

BACKGROUND OF THE INVENTION

1. Field of the Invention

The present invention relates generally to earth-to-orbit transport systems and, more specifically, to booster recovery systems including deployable wings.

2. Description of the Related Art

Space shuttle solid rocket boosters are currently recovered by parachute systems. These systems have obvious limitations, one of which is that a water recovery is required.

Consideration has been given in the past to the use of fixed, clipped delta or straight wings. Fixed wing configurations, although depicted in studies, have not yet been accepted as a viable recovery system for twin boosters. A primary disadvantage is the difficulty encountered in integrating twin boosters with any type of fixed wing with the orbiter. Any single booster with non-stowable wings must, of necessity, be offset. This offset results in higher loads on both booster and orbiter wings because of the adverse relationship between engine thrust and launch system center of gravity, thus necessitating flight at higher than normal angles of attack. Also, the large bow shock wave off of a booster may impinge on the orbiter wing, or visa versa, making it necessary to make the wing even stronger.

Another disadvantage of clipped delta wings for twin boosters is that, even when stowed by hinging them at the wing root, the frontal area is much greater than a high aspect ratio oblique wing stowed with the span dimension along the longitudinal axis of the booster.

U.S. Pat. No. 4,834,324 describes a multiconfiguration reusable space transport system in which a pivoting panel acts as a heat shield in a stowed position and as a wing in the unstowed position for recovery of a first stage unit. The first stage unit corresponds to the present space shuttle external tank. The wing is rotatable between two positions. During launch, the wing is positioned in alignment with the longitudinal axis of the first stage unit and is flush with the flat base of the body. During flight for returning to earth, the wing extends perpendicular to the unit axis to permit horizontal landing.

A problem with U.S. Pat. No. 4,834,324 is that the pivoting panel has high planform loadings (defined by entry weight divided by the entry plan form area), and there is no adequate provision for a mechanism to deploy the wing.

SUMMARY OF THE INVENTION

An object of the present invention is to provide a two-stage earth-to-orbit transport capable of maximizing payload.

Another object of the present invention is to provide booster recovery for two-stage earth-to-orbit transport without the use of parachutes.

Another object of the present invention is to provide a two-stage earth-to-orbit transport with translating, rotating oblique wings for booster recovery, in which a lower frontal drag during ascent is achieved, thereby enabling an increased payload.

Another object of the present invention is to provide a booster recovery design having a high lift-coefficient, thus making it possible to stage at higher altitudes and thereby improve staging efficiency.

Another object of the present invention is to provide a booster with a deployable wing which permits the booster to glide back to the launch/recovery site with a high margin in altitude.

These and other objects of the present invention are met by providing a two-stage earth-to-orbit transport including an orbiter vehicle, a pair of boosters disposed on diametrically opposite sides of the orbiter, each having a deployable wing located along a longitudinal axis of the booster during launch and being movable into an oblique disposition after separation of the boosters from the orbiter vehicle, means for pivotably and slidably coupling each wing to each corresponding booster, means for driving each wing in pivotable and sliding directions, and means for detachably coupling the pair of boosters to the orbiter vehicle.

These and other features and advantages of the two-stage earth-to-orbit transport of the present invention will become more apparent with reference to the following detailed description and drawings.

DETAILED DESCRIPTION OF THE PREFERRED EMBODIMENTS

Figure 1:
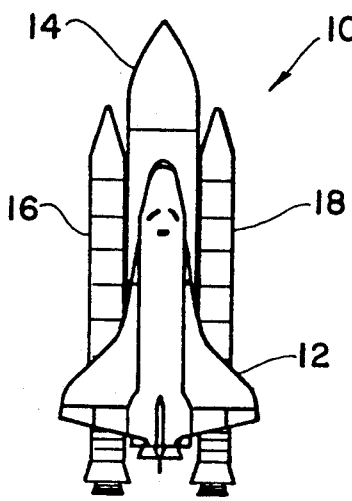
FIG. 1 is a top plan view of the space shuttle in use prior to the present invention.

Referring to FIG. 1, a two-stage earth-to-orbit transport is generally referred to by the numeral 10. The transport 10 is well known as the "space shuttle" operated by the National Aeronautics and Space Administration (NASA). The transport 10 includes an orbiter vehicle 12, an external fuel tank 14 and two boosters 16 and 18.

Figure 2:
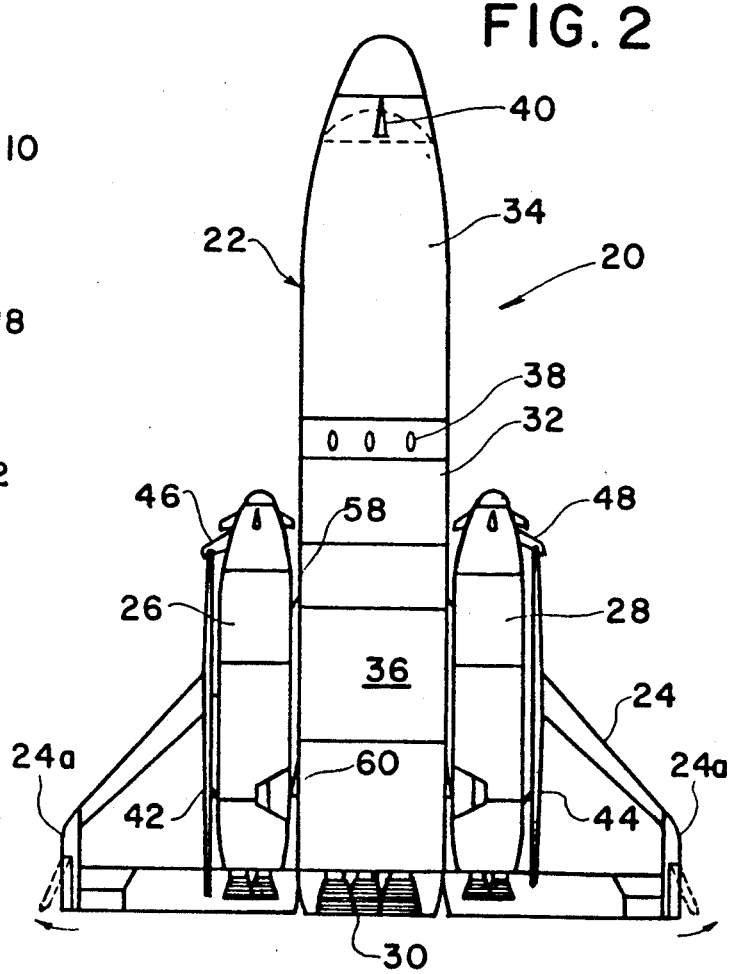
FIG. 2 is a top plan view of a two-stage earth-to-orbit transport according to a first, preferred embodiment of the present invention.
Figure 3:
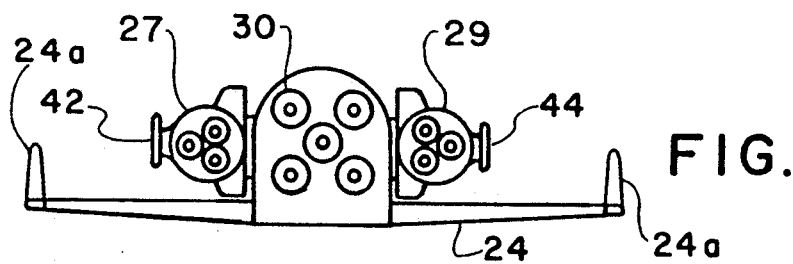
FIG. 3 is a rear view of the transport illustrated in FIG. 2.
Figure 4:
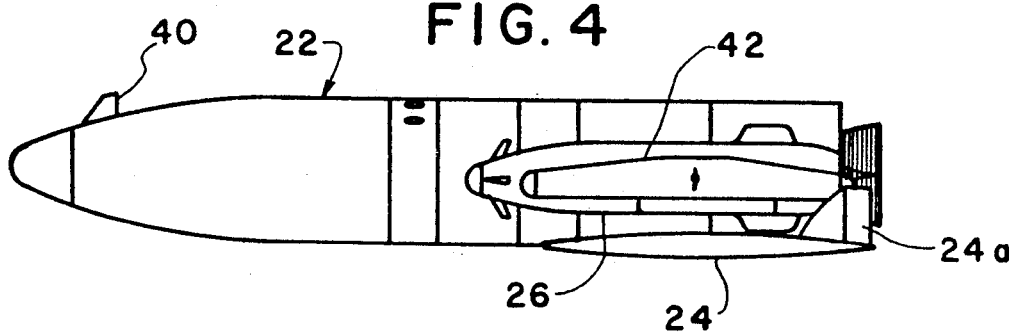
FIG. 4 is a side elevational view of the transport of FIG. 2.
Figure 5:
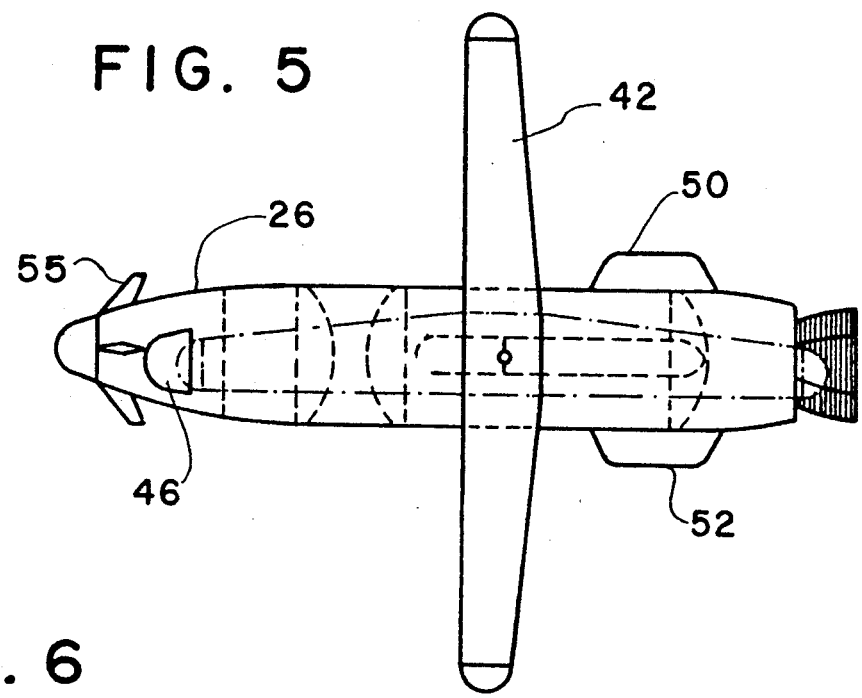
FIG. 5 is a top plan view of a booster used in the transport of FIG. 2, with a wing illustrated in the fully deployed position (90°), and showing the undeployed position in broken lines.
Figure 6:
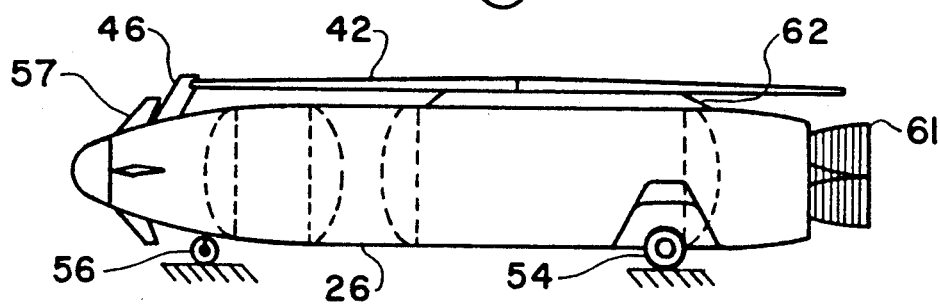
FIG. 6 is a side elevational view of the booster of FIG. 5, with the wing in the undeployed position.

The two-stage earth-to-orbit transport according to the present invention is illustrated in FIG. 2 and generally referred to by the numeral 20. The transport 20 includes an orbiter vehicle 22 having a clipped delta wing 24. A pair of boosters 26 and 28 are disposed on diametrically opposite sides of the orbiter vehicle 22. FIG. 3 illustrates that bodies 27 and 29 of boosters 26 and 28 have substanially circular cross-sections for most of their lengths. The launch (or two stage earth-to-orbit) vehicle 20 provides a core stage which preferably has five space shuttle main engines (SSME) 30 which run on liquid fuel. The orbiter vehicle has a gross weight of about 2,450,000 lbs., with cargo being carried in a space 32 between a liquid hydrogen tank 34 and a liquid oxygen tank 36. The cargo space 32 is thirty feet in diameter and fifteen feet long.

The pilot's canopy which was used in the original space shuttle has been eliminated in the interest of weight savings and reduced drag. In its place, a nose gear-deployed TV camera is supplied to provide the pilot with forward visibility for landing. Three flush mounted circular viewing ports 38 about four feet in diameter are provided so that the crew can see the side of the runway out of the ports. Also, since the orbiter vehicle 22 is too large to ferry on a large plane, two 747 engines, rated at 56,700 lbs. thrust each are attached to the vehicle after recovery in order to ferry the vehicle back to the launch site.

The vehicle 22 is provided with a dorsal fin 40 and two tip fin controllers 24a. The dorsal fin is used for directional control and the tip fins are used for energy management during unpowered descent to landing.

The boosters 26 and 28 each have a deployable wing 42 and 44 which are located on top along a longitudinal axis of the respective boosters during launch and ascent. Each wing 42 and 44 is movable into an oblique disposition after separation of the boosters from the orbiter vehicle 22, by means to be described in greater detail below.

Each wing is of a high aspect ratio and is mounted for translatory and rotational movement. The wings are referred to as "oblique" wings, since they are deployable at a variety of angles between 0° and 90° relative to the vertical symmetry plane of the booster. This gives the wing the quality of having a variable sweep, with the option of using an unswept configuration in subsonic glide and landing. Prior to deployment, the wings are locked into position with the wing tip mechanically locked to prevent flutter during ascent. For this purpose, each booster is provided with a streamlined tip hold-down 46 and 48, each of which is hinged to move downwardly into a flush disposition with an outer surface of the boosters after the wings are released, thus, minimizing booster drag during the glide flight back to the launching area.

Referring to FIGS. 5-8, the booster 26 is illustrated with the wing 42 deployed in a 90° disposition. The wing is also shown in broken lines in the stowed position with the wing tip secured by the hold-down 46. At the end rear portion of booster 26 a pair of wheel wells 50 and 52 are provided on opposite sides thereof for receiving main landing gear 54. A nose landing gear 56 is retractable into the body of the booster 26. Canards 55 are provided at the nose portion, along with dorsals 57 for controlling pitch, yaw and roll. Roll is controlled during subsonic flight by movable surfaces, i.e., flaps, provided at the trailing edges of the wings. Trim capability is provided by axial movement of the wing, by means to be described below.

At separation, mechanical locks are released by using pyrotechnics, and the wings are deployed in a highly oblique position. Simultaneously, the wing pivot point is adjusted to trim position suitable for the flight Mach number, wing angle, angle of attack, and center of gravity.

Referring to FIG. 2, each booster is detachably coupled to the orbiter vehicle by a forward fitting 58 and an aft fitting 60. At staging, the two boosters are released at the forward fitting 58 and allowed to rotate through a small angle (about 3°) prior to release at the aft fitting. The forward fitting only reacts to compressive or tensile loads while the aft fitting reacts to tension-compression and axial shear (thrust) loads. The forward and aft fittings which are used in the space shuttle illustrated in FIG. 1 can be adapted for use with the vehicle of FIG. 2. The fittings may be provided with time delay pyrotechnics to effect the release in the sequence prescribed. The plane of rotation is perpendicular to the plane of the side panel of the body. This is done in order to give adequate clearance between the core vehicle or orbiter vehicle 22 and the boosters and to allow for uncertainties in tipoff during booster separation.

Each of the boosters is preferably provided with three 625,000 lb. (sea level) thrust hydrocarbon engines 61 with hydrogen gas generators. Cross-feed of liquid fuel may or may not be provided with the engines of the orbiter vehicle 22.

Figure 7:
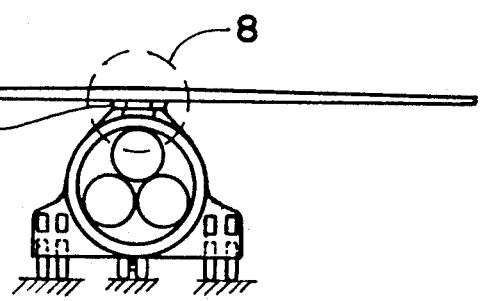
FIG. 7 is a rear view of the booster of FIG. 5, showing the wing in the 90° deployed position.
Figure 8:
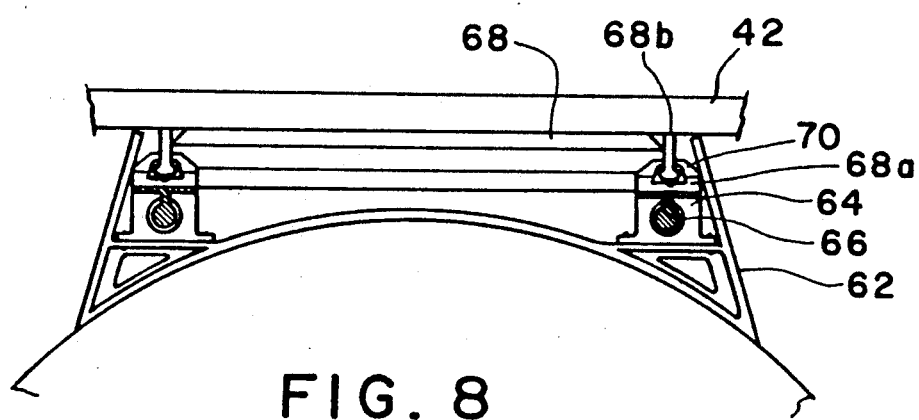
FIG. 8 is an enlarged, sectional view, taken from the encircled area 8 of FIG. 7.

Translatory and rotational movement is facilitated by means disposed in a pylon 62 formed at the top of each booster. Referring to FIGS. 7 and 8, a pair of longitudinally disposed linear bearings 64 are provided within the pylon 62 at opposite sides of the verticle symmetry plane of the booster. The linear bearings 64 act as a pillow block for actuator rods 66 which are driven in the axial direction by suitable drive means, such as an electric motor, hydraulic ram, etc. (not shown).

A turret 68 is operatively connected to the actuator rods 66, which are driven simultaneously by the drive means to translate the turret 68 fore and aft. The wing 42 is connected to the turret, which is provided with a circular bearing 70 which facilitates rotational movement. The circular bearing 70 has a diameter approximately equal to the distance between linear bearings 64. The turret 68 has a stationary part 68a which is directly coupled to the actuator rods 66 so as to facilitate fore and aft movement of the turret. A rotating part 68b is coupled to the wing so as to rotate therewith and is journalled in the stationary part 68a so as to facilitate rotational movement. The turret thus provides a carriage for the wing, the linear bearing provides a track for moving the carriage axially.

Rotation of the turrent may be provided by any conventional means, such as by an electric motor coupled to the rotational part 68b through a speed reducing gear (not shown).

Although the embodiment described above uses linear bearings, an alternative drive mechanism which may be used in the present invention includes a ball nut and ball screw arrangement which provides a worm drive.

Using the structure described above, the wing can be continuously driven during flight as a method for trimming the vehicle. The wing would preferably be deployed to the 90° position while the booster is held to 3° angle of attack or less in order to minimize the dynamic load during deployment. For staging at Mach 3, the anticipated dynamic pressure is 275-325 lbs. per square foot. The booster would then bank in an inverted position curving back to the launch site and downward at a limiting G loading of 2.5-3.5 (referring to accelerations normal to the vehicle principal body axis). Typically, the wing is used at oblique angles for hypersonic and supersonic flight, and is deployed to the 90° position for subsonic flight. In order to land two boosters at the same airfield, either parallel runways may be used, or the downwind glide path of one of the boosters is extended so that the booster landing first can coast during rollout to an off-runway site, such as taxi-way.

An alternative embodiment envisioned by the present invention is to rotate the two boosters about their principal axes 90° in opposite directions so that planform of the two wings would be visible in the planform view of the launch configuration. The forebody of the boosters could not be faired to make them more streamlined, as in the preferred configuration of FIG. 2. Such fairing would reduce ascent drag slightly but would increase the development, design, tooling and manufacturing costs.

As a further alternative, the nose gear could consist of a single central strut in a dual wheel assembly, or the boosters may be equipped with skids for the main gear in lieu of pneumatic tires and brakes.

As still another embodiment, a single (larger) booster could be employed with a single oblique wing. A weight penalty would be encountered because of the necessity to fly with offset centers of gravity that occur when two rocket stages are attached in parallel but all the propellant is being depleted from the booster directly into the orbiter engines and via a cross-feed from the booster tanks.

By using the oblique wing according to the present invention, a lower frontal drag during ascent is obtained. This is an advantage because of the lower ascent drag will realize an increased payload. The increase in payload, while difficult to access, could amount to about one percent. For a 65,000 lb. payload, this could amount to an increase of 650 lbs. of payload or, at $10,000 per pound, 6.5 million dollars per launch saved in payload delivery costs.

Also, by changing from water-recoverable solids to glideback-liquid boosters, a savings per flight of between $40 and $60 million is estimated.

Numerous modifications and adaptions of the two-stage earth-to-orbit transport of the present invention will be apparent to those skilled in the art and thus, it is intended by the following claims to cover all such modifications and adaptions which fall within the true spirit and scope of the invention.

What is claimed is:

1. A two-stage earth-to-orbit transport comprising:
   an orbiter vehicle;
   a pair of boosters disposed at diametrically opposite sides of the orbiter, each having a deployable wing located on top of each booster along a longitudinal axis of each booster during launch and being movable into an oblique disposition after separation of the boosters from the orbiter vehicle;
   means for pivotally and slidably coupling each wing to each corresponding booster, the pivotal and slidable coupling means comprising for each booster a longitudinal track coupled to and centered above each booster, a carriage slidably mounted on the track allowing translational movement of the wing along the longitudinal axis of each booster, and means disposed between the wing and the carriage for rotating the wing about a vertical axis; the track including first and second linear bearings disposed symmetrically about a vertical symmetry plane of the booster and first and second actuator rods slidably received in the first and second linear bearings, respectively, for simultaneously axial movement, the first and second actuator rods being coupled to the carriage to impart translational movement to the carriage, the rotating means having a diameter approximately equal to the width of the track, the rotating means comprising a turret having a circular bearing, wherein a bottom portion of the turret is the carriage;
   means for driving each wing in pivotal and sliding directions, the driving means including a first motor for rotating the turret and a second motor for axially moving the first and second actuator rods;
   means for detachably coupling the pair of boosters to the orbiter vehicle, the detachable coupling means including, for each booster, a forward fitting reacting to compression/tension loads and an aft fitting reacting to compression/tension loads and axial shear loads;
   means for holding secure a forward tip of the deployable wing for each booster during ascent, the holding means comprising a hold-down fairing for holding the forward tip of the wing for each booster during ascent, the fairing being movable into a position flush with an outer surface of the orbiter vehicle after rearward translation of the wing; and
   means for landing each booster horizontally, each landing means being located opposite each deployable wing.

2. A two-stage earth-to-orbit transport as claimed in claim 1, wherein the orbiter vehicle has a clipped delta wing.

3. A booster for use in a two-stage earth-to-orbit transport comprising:
   an elongated body having a substantially circular cross-section, a nose portion, and a rear portion;
   at least one rocket engine disposed at the rear portion of the body;
   a deployable wing located on top of the body along a longitudinal axis of the body during launch and being movable into an oblique disposition after separation of the booster from an orbiter vehicle;
   means for pivotally and slidably coupling the wing to the body, the pivotal and slidable coupling means comprising a longitudinal track coupled to and centered above the body, a carriage slidably mounted on the track allowing translational movement of the wing along the longitudinal axis of the body, and means disposed between the wing and the carriage for rotating the wing about a vertical axis; the track including first and second linear bearings disposed symmetrically about a vertical symmetry plane of the booster and first and second actuator rods slidably received in the first and second linear bearings, respectively, for simultaneously axial movement, the first and second actuator rods being coupled to the carriage to impart translational movement to the carriage, the rotating means having a diameter approximately equal to the width of the track, the rotating means comprising a turret having a circular bearing, wherein a bottom portion of the turret is the carriage;
   means for driving the wing in pivotal and sliding directions, the driving means including a first motor for rotating the turret and a second motor for axially moving the first and second actuator rods;

means for detachably coupling the body to the orbiter vehicle, the detachable coupling means including a forward fitting reacting to compression/tension loads and an aft fitting reacting to compression/tension loads and axial shear loads;

means for holding secure a forward tip of the deployable wing of the booster during ascent, the holding means comprising a hold-down fairing for holding the forward tip of the wing of the booster during ascent, the fairing being movable into a position flush with an outer surface of the orbiter vehicle after rearward translation of the wing; and means for landing the booster horizontally, the landing means being located opposite the deployable wing.

* * * * *